(12) United States Patent
Tsai (10) Patent No.: US 10,897,872 B2
(45) Date of Patent: Jan. 26, 2021

(54) PAPER BOX ASSEMBLY

(71) Applicant: Po-Chun Huang, Taipei (TW)

(72) Inventor: Szu-Ti Tsai, Taipei (TW)

(73) Assignee: Po-Chun Huang, Taipei (TW)

( * ) Notice: Subject to any disclaimer, the term of this patent is extended or adjusted under 35 U.S.C. 154(b) by 395 days.

(21) Appl. No.: 15/937,939

(22) Filed: Mar. 28, 2018

(65) Prior Publication Data

US 2019/0297837 A1 Oct. 3, 2019

(51) Int. Cl.
*A01K 1/03* (2006.01)
*F16B 7/22* (2006.01)
*B65D 5/02* (2006.01)

(52) U.S. Cl.
CPC ............ *A01K 1/033* (2013.01); *B65D 5/0254* (2013.01); *F16B 7/22* (2013.01)

(58) Field of Classification Search
CPC ......... A01K 1/033; F16B 7/22; F16B 5/0635; B65D 5/0254; B65D 5/427; B65D 21/0201; B65D 21/0204; B65D 5/30; B65D 5/38; B65D 5/5038; B65D 5/5495
USPC ... 229/120.011, 915, 120.01, 149, 195, 913; 206/821, 504, 509; 312/108; 220/23.4, 220/23.89; 493/137, 84
See application file for complete search history.

(56) References Cited

U.S. PATENT DOCUMENTS

| | | | | |
|---|---|---|---|---|
| 2,350,280 | A * | 5/1944 | Holtzman | A47B 43/02 312/261 |
| 3,552,579 | A * | 1/1971 | Simon | A47B 87/02 211/126.12 |
| 6,431,436 | B1 * | 8/2002 | Evers | B65D 5/448 206/504 |
| 9,611,072 | B2 * | 4/2017 | Sharon | B65D 21/0204 |
| 10,266,302 | B1 * | 4/2019 | Duarte | B65D 5/48024 |
| 2020/0093091 | A1 * | 3/2020 | Lu | A01K 1/033 |

* cited by examiner

*Primary Examiner* — Christopher R Demeree
(74) *Attorney, Agent, or Firm* — Alan D. Kamrath; Karin L. Williams; Mayer & Williams PC (57) ABSTRACT

A paper box assembly includes at least one first box, at least one second box and at least one connecting piece. The at least one first box includes a plurality of first plates and at least one first slot. The at least one second box includes a plurality of second plates and at least one second slot. The at least one connecting piece includes a first insert, a second insert and a bendable connecting portion. Two insertion spaces formed on the bendable connecting portion and defined between the first insert and the second insert. The first insert is inserted into the first slot. The second insert is inserted into the second slot. Thus, the at least one first box and the at least one second box are connected by the at least one connecting piece.

17 Claims, 7 Drawing Sheets

PAPER BOX ASSEMBLY

BACKGROUND OF THE INVENTION

1. Field of the Invention

The present invention relates to a box assembly and, more particularly, to a paper box assembly for pets, such as cats or the like.

2. Description of the Related Art

A cat house is available for cats so that the cats may play or hide in the cat house. A conventional cat house is usually made of wood, plastic or paper material, and has special design and construction for the cats, so that the conventional cat house has complicated procedures of fabrication, thereby increasing the cost of production. In addition, the conventional cat house is not made of wasted material so that the conventional cat house cannot achieve the purposes of environment protection and waste reuse.

BRIEF SUMMARY OF THE INVENTION

The primary objective of the present invention is to provide a paper box assembly that is assembled easily, quickly and conveniently.

In accordance with the present invention, there is provided a paper box assembly comprising at least one first box, at least one second box and at least one connecting piece. The at least one first box includes a plurality of first plates and a plurality of first bent sections defined between the first plates. At least one of the first bent sections is formed with a first slot. The at least one second box includes a plurality of second plates and a plurality of second bent sections defined between the second plates. At least one of the second bent sections is formed with a second slot. The at least one connecting piece includes a first insert, a second insert connected with the first insert, and a bendable connecting portion defined between the first insert and the second insert. The at least one connecting piece includes two insertion spaces formed on two opposite ends of the bendable connecting portion and defined between the first insert and the second insert. The first insert is inserted into the first slot. The second insert is inserted into the second slot. The bendable connecting portion is located between the first plates and the second plates. The first plates and the second plates are located between the two insertion spaces.

Further benefits and advantages of the present invention will become apparent after a careful reading of the detailed description with appropriate reference to the accompanying drawings.

DETAILED DESCRIPTION OF THE INVENTION

Figure 1:
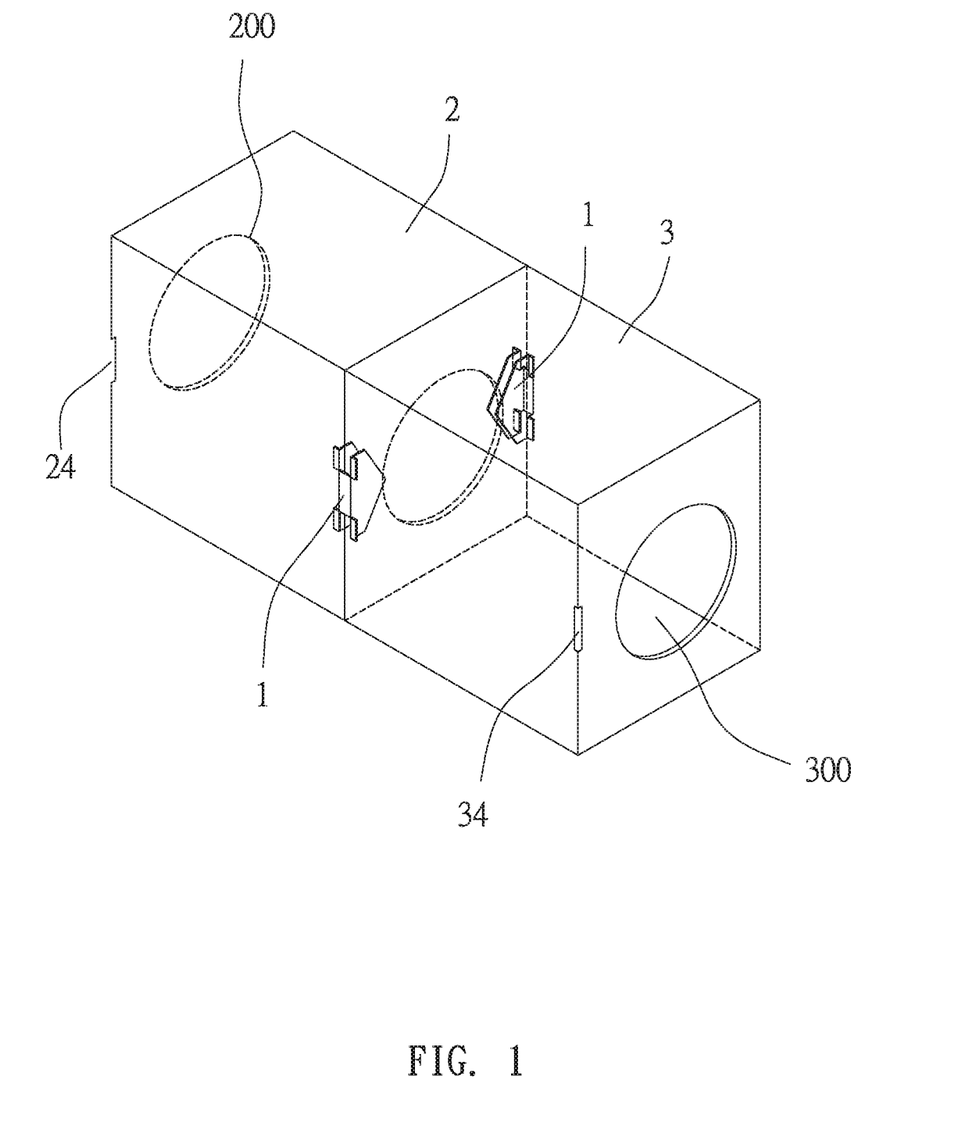
FIG. 1 is a perspective view of a paper box assembly in accordance with the preferred embodiment of the present invention.
Figure 2:
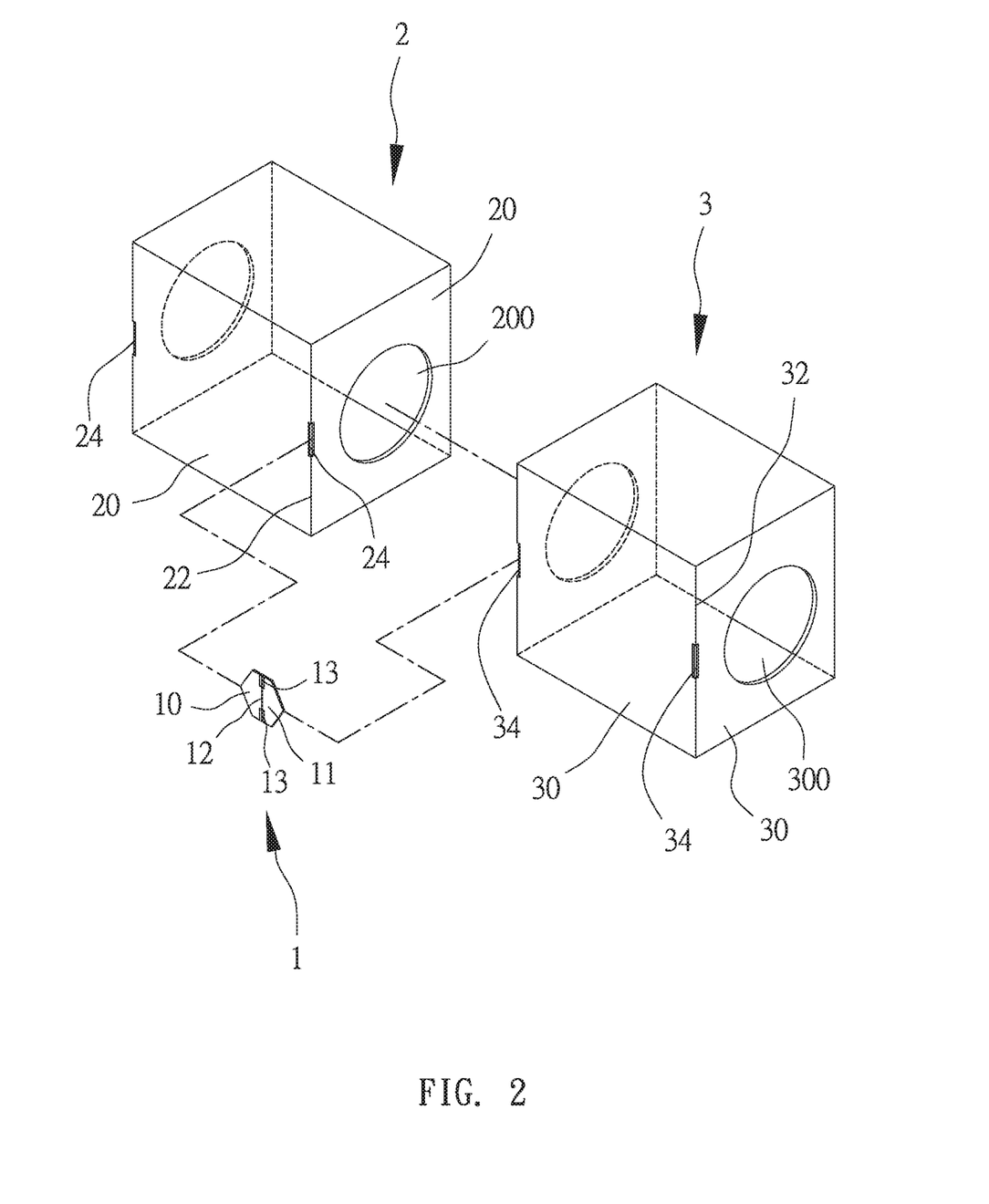
FIG. 2 is an exploded perspective view of the paper box assembly as shown in FIG. 1.
Figure 3:
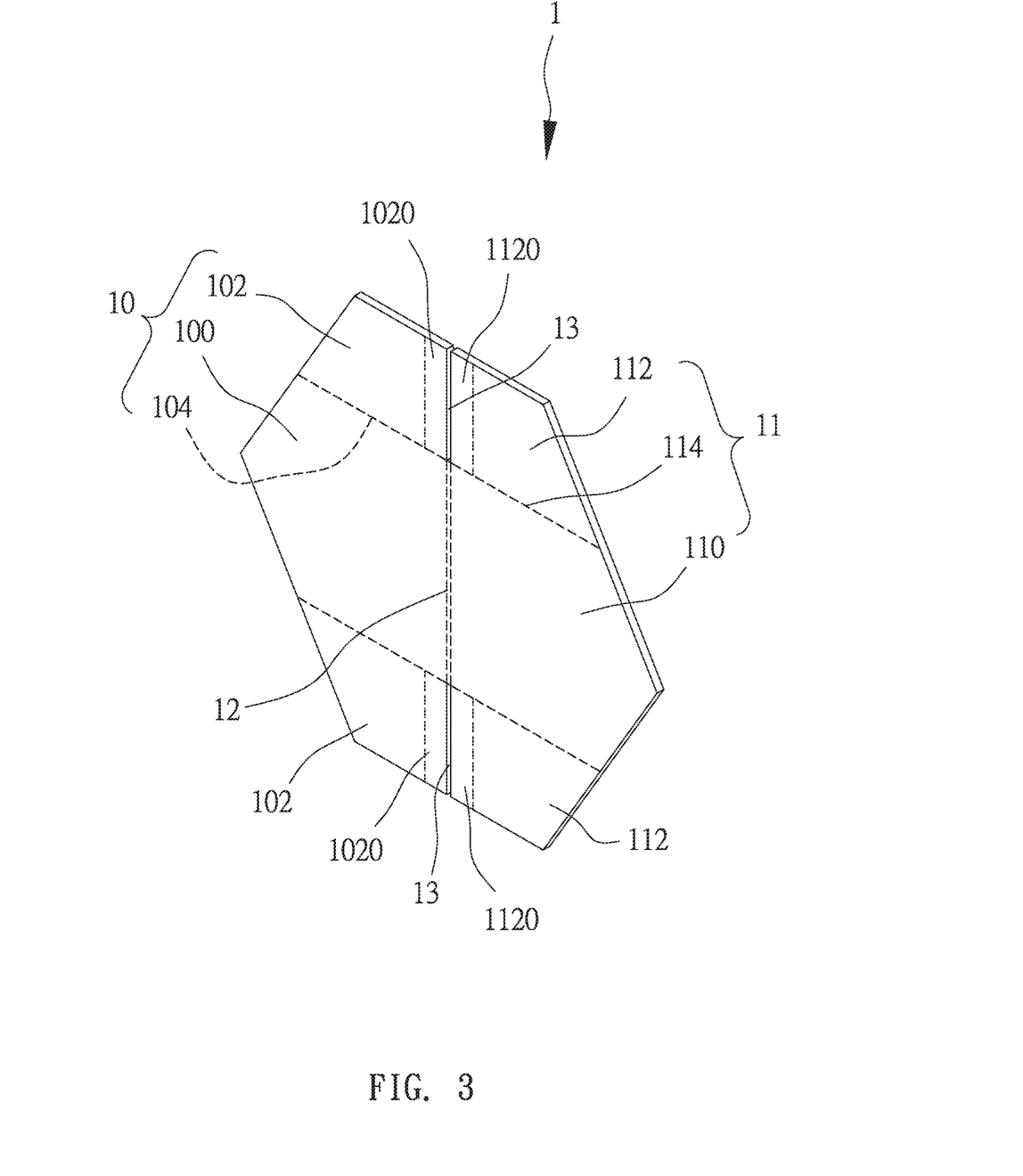
FIG. 3 is a perspective view of a connecting piece of the paper box assembly in accordance with the preferred embodiment of the present invention.

Referring to the drawings and initially to FIGS. 1-3, a paper box assembly in accordance with the preferred embodiment of the present invention comprises at least one first box 2, at least one second box 3 and at least one connecting piece 1.

The at least one first box 2 is made of paper material, such as a paperboard, and includes a plurality of first plates 20 and a plurality of first bent sections 22 defined between the first plates 20. The first plates 20 are bent and combined to construct the at least one first box 2. At least one of the first bent sections 22 is formed with a first slot 24.

The at least one second box 3 is made of paper material, such as a paperboard, and includes a plurality of second plates 30 and a plurality of second bent sections 32 defined between the second plates 30. The second plates 30 are bent and combined to construct the at least one second box 3. At least one of the second bent sections 32 is formed with a second slot 34.

The at least one connecting piece 1 is made of paper material, such as a paperboard, that is cut to construct the at least one connecting piece 1. The at least one connecting piece 1 includes a first insert 10, a second insert 11 connected with the first insert 10, and a bendable connecting portion 12 defined between the first insert 10 and the second insert 11. The at least one connecting piece 1 includes two insertion spaces 13 formed on two opposite ends of the bendable connecting portion 12 and defined between the first insert 10 and the second insert 11. The first insert 10 is inserted into the first slot 24.

The second insert 11 is inserted into the second slot 34. The bendable connecting portion 12 is located between the first plates 20 and the second plates 30. The first plates 20 and the second plates 30 are located between the two insertion spaces 13.

In the preferred embodiment of the present invention, the first insert 10 includes a first main section 100, two first wings 102 extending from two opposite ends of the first main section 100, and two first bendable connecting sections 104 each defined between the first main section 100 and one of the two first wings 102.

In the preferred embodiment of the present invention, the second insert 11 includes a second main section 110, two second wings 112 extending from two opposite ends of the second main section 110, and two second bendable connecting sections 114 each defined between the second main section 110 and one of the two second wings 112. The second main section 110 and the first main section 100 are connected by the bendable connecting portion 12.

In the preferred embodiment of the present invention, each of the two insertion spaces 13 is defined between one of the two first wings 102 and one of the two second wings 112.

In the preferred embodiment of the present invention, each of the two first wings 102 is formed with a bendable first abutment 1020 connected to one of the two insertion spaces 13.

In the preferred embodiment of the present invention, each of the two second wings 112 is formed with a bendable second abutment 1120 connected to one of the two insertion spaces 13.

In the preferred embodiment of the present invention, at least one of the first plates 20 is formed with a first connecting hole 200, and at least one of the second plates 30 is formed with a second connecting hole 300 connected to the first connecting hole 200.

Figure 4:
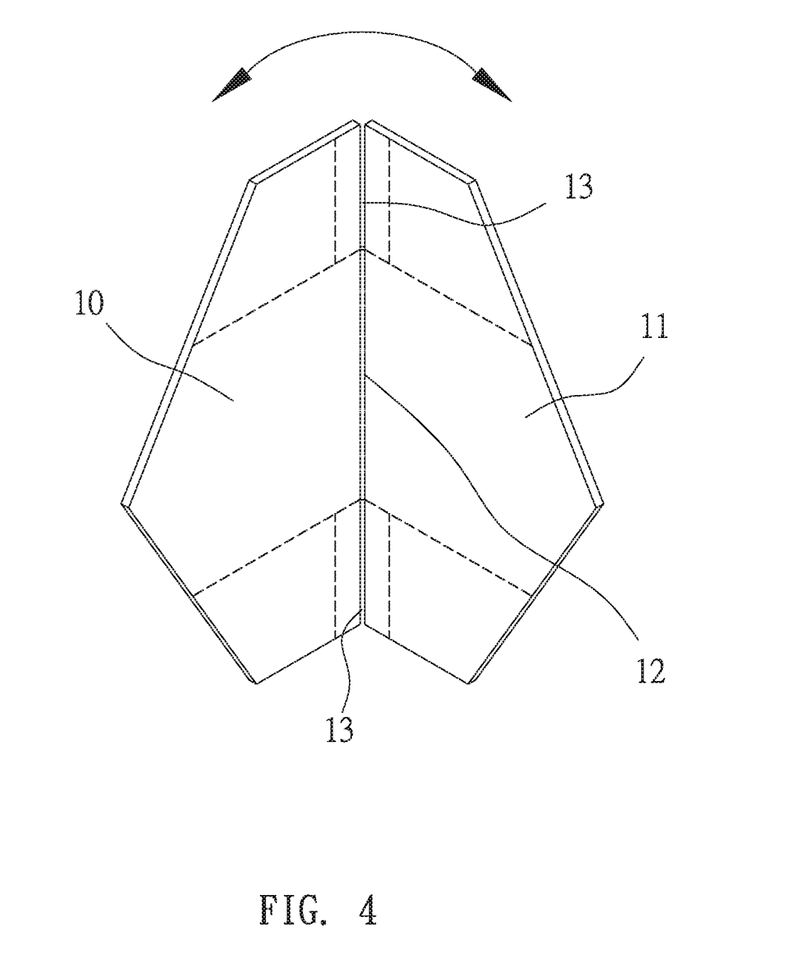
FIG. 4 is a perspective view showing a first bending of the connecting piece.
Figure 5:
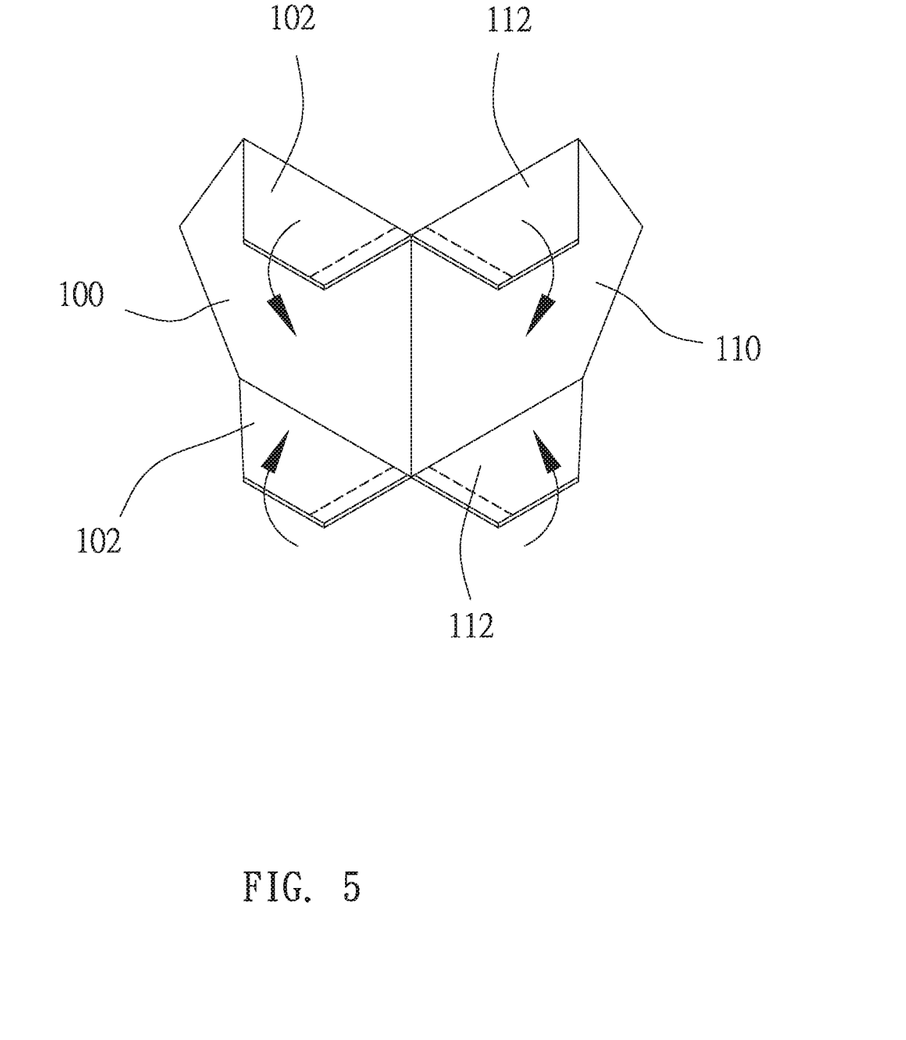
FIG. 5 is a perspective view showing a second bending of the connecting piece.

Referring to FIGS. 4 and 5 with reference to FIGS. 1-3, when the at least one connecting piece 1 is bent, the first insert 10 and the second insert 11 are moved toward each other, and the bendable connecting portion 12 is bent as shown in FIG. 4. Then, the at least one connecting piece 1 is cut to form the two insertion spaces 13 each of which is formed on the two opposite ends of the bendable connecting portion 12 and located between the first insert 10 and the second insert 11. Thus, the at least one connecting piece 1 is initially bent and cut.

Subsequently, the at least one connecting piece 1 is further bent, with two opposite ends of the first insert 10 being moved toward each other to form the two first wings 102, and with two opposite ends of the second insert 11 being moved toward each other to form the two second wings 112 as shown in FIG. 5. Thus, bending of the at least one connecting piece 1 is finished.

Figure 6:
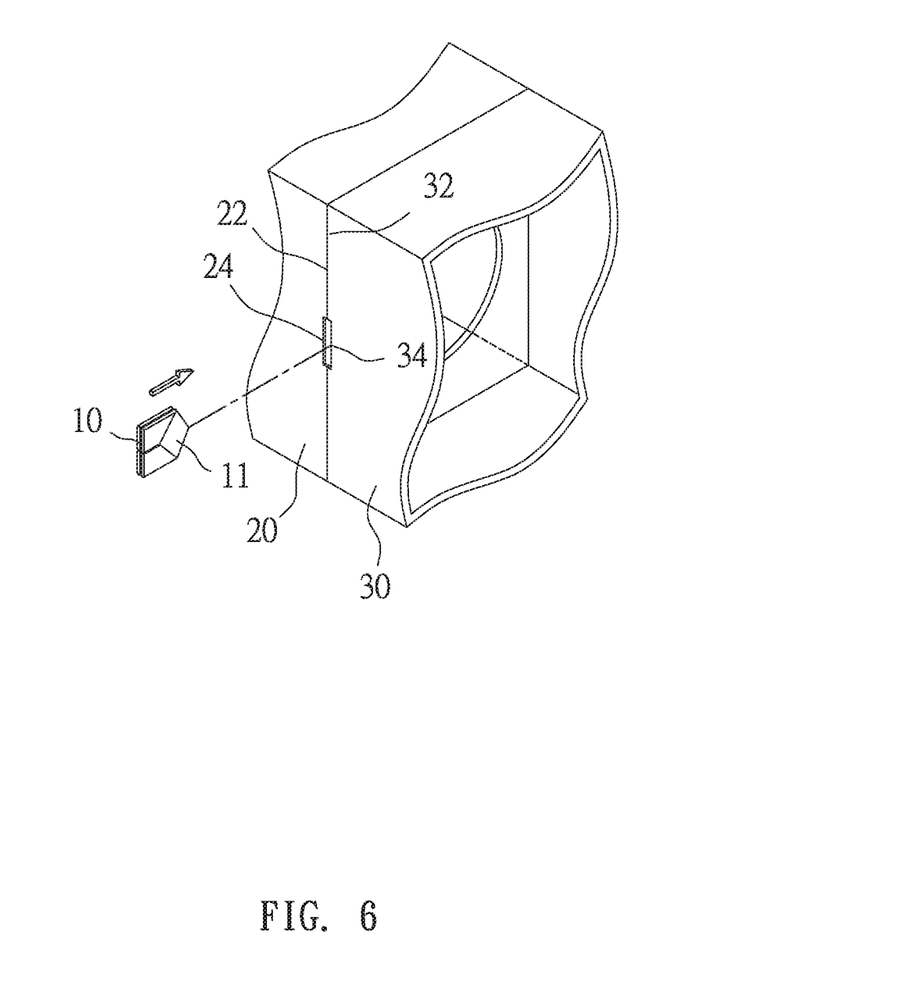
FIG. 6 is a schematic perspective operational view showing insertion of the connecting piece into the first box and the second box.
Figure 7:
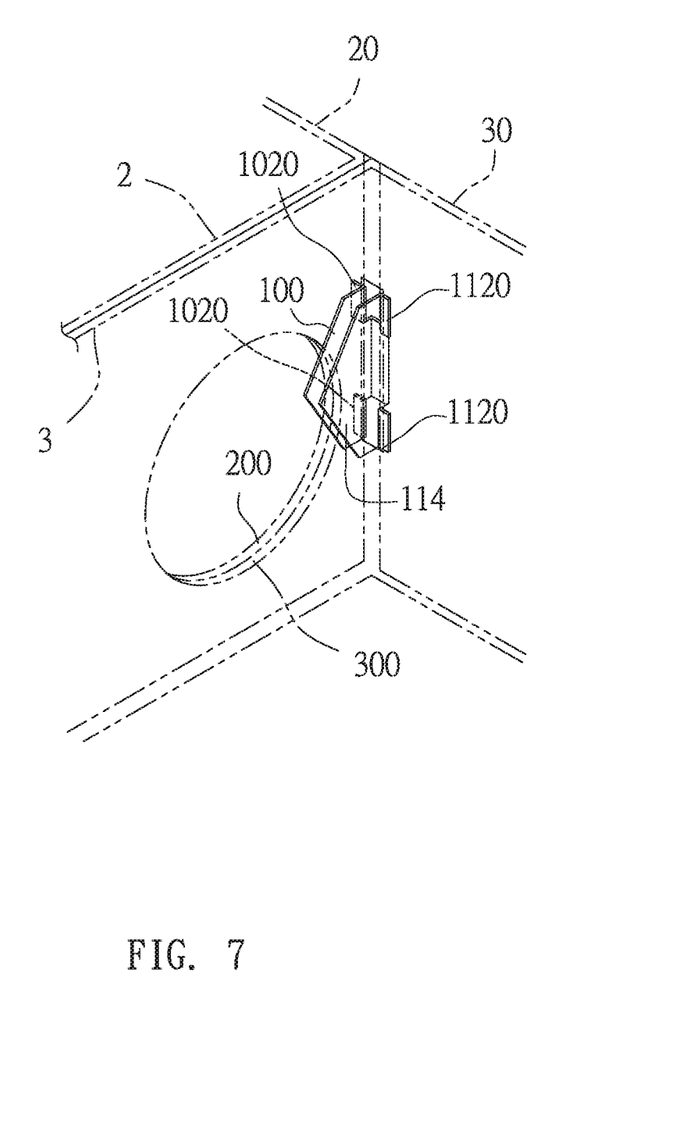
FIG. 7 is a schematic perspective operational view showing the connecting piece is inserted into the first box and the second box.

Referring to FIGS. 6 and 7 with reference to FIGS. 1-5, the at least one first box 2 and the at least one second box 3 are juxtaposed to each other, with the second connecting hole 300 being connected to the first connecting hole 200. Above all, the first slot 24 of the at least one first box 2 and the second slot 34 of the at least one second box 3 are corresponding and juxtaposed to each other as shown in FIG. 6. Then, the first insert 10 that is bent is inserted into the first slot 24, and the second insert 11 that is bent is inserted into the second slot 34. At the same time, the bendable connecting portion 12 is located at the first plates 20 and the second plates 30 that are juxtaposed to each other.

It is appreciated that, the at least one connecting piece 1 is made of paper material. Thus, after the two first wings 102 of the first insert 10 are bent and inserted into the first slot 24, and after the two second wings 112 of the second insert 11 are bent and inserted into the second slot 34, the two first wings 102 and the two second wings 112 are restored to the original unbent position by the restoring feature of the paper material, so that the two first wings 102 rest on the inner face of the at least one first box 2, and the two second wings 112 rest on the inner face of the at least one second box 3. In such a manner, the at least one connecting piece 1 connects and secures the at least one first box 2 and the at least one second box 3. At the same time, the bendable first abutment 1020 of each of the two first wings 102 rests on the first plates 20, and the bendable second abutment 1120 of each of the two second wings 112 rests on the second plates 30 as shown in FIG. 7, to enhance the structural strength of the combination of the first insert 10, the second insert 11, the at least one first box 2 and the at least one second box 3.

Accordingly, the at least one first box 2 and the at least one second box 3 are connected by the at least one connecting piece 1, so that the paper box assembly is assembled easily, quickly and conveniently, thereby facilitating the user assembling the paper box assembly. In addition, the at least one connecting piece 1 is made of a paperboard that is chosen by wasted paper material, thereby achieving the purposes of environment protection and waste reuse.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A paper box assembly comprising:
   at least one first box, at least one second box and at least one connecting piece;
   wherein:
   the at least one first box includes a plurality of first plates and a plurality of first bent sections defined between the first plates;
   at least one of the first bent sections is formed with a first slot;
   the at least one second box includes a plurality of second plates and a plurality of second bent sections defined between the second plates;
   at least one of the second bent sections is formed with a second slot;
   the at least one connecting piece includes a first insert, a second insert connected with the first insert, and a bendable connecting portion defined between and connecting the first insert and the second insert;
   the at least one connecting piece includes two insertion spaces formed on two opposite ends of the bendable connecting portion and defined between the first insert and the second insert;
   the first insert is inserted into the first slot;
   the second insert is inserted into the second slot;
   the bendable connecting portion is located between one of the first plates and one of the second plates; and
   one of the first plates and one of the second plates are located between the first insert and the second insert.

2. The paper box assembly of claim 1, wherein the first insert includes a first main section, two first wings extending from and bendable relative to two opposite ends of the first main section, and two first bendable connecting sections each defined between and connecting the first main section and one of the two first wings.

3. The paper box assembly of claim 2, wherein:
   the second insert includes a second main section, two second wings extending from and bendable relative to two opposite ends of the second main section, and two second bendable connecting sections each defined between and connecting the second main section and one of the two second wings; and
   the second main section and the first main section are connected by and bendable relative to the bendable connecting portion.

4. The paper box assembly of claim 3, wherein each of the two insertion spaces is defined between one of the two first wings and one of the two second wings.

5. The paper box assembly of claim 4, wherein each of the two first wings is formed with a bendable first abutment connected to one of the two insertion spaces.

6. The paper box assembly of claim 5, wherein each of the two second wings is formed with a bendable second abutment connected to one of the two insertion spaces.

7. The paper box assembly of claim 6, wherein the bendable first abutment rests on one of the first plates, and the bendable second abutment rests on one of the second plates.

8. The paper box assembly of claim 6, wherein the bendable first abutment is perpendicular to each of the two first wings, and the bendable second abutment is perpendicular to each of the two second wings.

9. The paper box assembly of claim 1, wherein at least one of the first plates is formed with a first connecting hole, and at least one of the second plates is formed with a second connecting hole connected to the first connecting hole.

10. The paper box assembly of claim 9, wherein the at least one first box and the at least one second box are juxtaposed to each other, with the second connecting hole being connected to the first connecting hole.

11. The paper box assembly of claim 1, wherein the first slot and the second slot are juxtaposed to each other.

12. The paper box assembly of claim 1, wherein one of the first plates is juxtaposed to one of the second plates.

13. The paper box assembly of claim 1, wherein the bendable connecting portion rests on one of the first plates and one of the second plates.

14. The paper box assembly of claim 1, wherein the first insert rests on one of the first plates, and the second insert rests on one of the second plates.

15. The paper box assembly of claim 1, wherein one of the first plates and one of the second plates are juxtaposed to each other and are limited by the first insert, the second insert, and the bendable connecting portion.

16. The paper box assembly of claim 1, wherein the first insert fully passes through the first slot, and the second insert fully passes through the second slot.

17. The paper box assembly of claim 1, wherein the first insert is fully received in the first box, and the second insert is fully received in the second box.

* * * * *